(12) United States Patent
Tan (10) Patent No.: US 12,417,781 B2
(45) Date of Patent: Sep. 16, 2025

(54) MAGNETICALLY STABILIZED PIVOTABLE TONEARM

(71) Applicant: Victor Tan, Singapore (SG)

(72) Inventor: Victor Tan, Singapore (SG)

( * ) Notice: Subject to any disclaimer, the term of this patent is extended or adjusted under 35 U.S.C. 154(b) by 0 days.

(21) Appl. No.: 18/385,948

(22) Filed: Nov. 1, 2023

(65) Prior Publication Data

US 2025/0140282 A1 May 1, 2025

(51) Int. Cl.
*G11B 3/12* (2006.01)
(52) U.S. Cl.
CPC ..................... *G11B 3/125* (2013.01)
(58) Field of Classification Search
None
See application file for complete search history.

(56) References Cited

U.S. PATENT DOCUMENTS

| | | | | | |
|---|---|---|---|---|---|
| 3,156,472 | A | * | 11/1964 | Brock | F16C 32/0427 369/255 |
| 3,623,734 | A | * | 11/1971 | Sakamoto | G11B 3/125 369/128 |
| 3,830,505 | A | * | 8/1974 | Rabinow | G11B 3/125 369/230 |
| 4,062,548 | A | * | 12/1977 | Kagata | G11B 3/091 |
| 4,079,943 | A | * | 3/1978 | Morita | G11B 3/14 |
| 4,102,536 | A | * | 7/1978 | Clunis | G11B 3/128 |
| 4,170,360 | A | * | 10/1979 | Ohsawa | G11B 3/125 369/233 |
| 4,170,361 | A | * | 10/1979 | Zwicky | F16C 32/02 369/255 |
| 4,170,362 | A | * | 10/1979 | Zwicky | G11B 3/125 369/255 |
| 4,570,253 | A | * | 2/1986 | Firebaugh | G11B 3/18 |
| 2004/0196775 | A1 | * | 10/2004 | Schroder | G11B 3/125 369/127 |
| 2006/0198280 | A1 | * | 9/2006 | Huynh | G11B 3/31 |
| 2010/0080108 | A1 | * | 4/2010 | Perkins | G11B 3/16 369/233 |
| 2023/0360670 | A1 | * | 11/2023 | Braine | G11B 3/145 |
| 2024/0144958 | A1 | * | 5/2024 | Viggiano | G11B 3/38 |

* cited by examiner

*Primary Examiner* — William J Klimowicz (57) ABSTRACT

A uniquely pivotable tonearm stabilized by magnetic fields to achieve superior fidelity during playback, is disclosed. The tonearm comprises a tonearm and an arm wand suspended using two or more torsional elements. A top nut assembly is positioned over a top chassis. The top nut assembly is rotated to provide anti-skating force by rotating counter clockwise. The torsional elements are suspended from the top nut assembly and mounted to the arm wand body as an inverted V configuration. The tonearm further comprises two or more magnets including a ring magnet mounted on a lower chassis body and a pair of cylindrical magnets mounted in the arm wand body. Further, a counterweight is mounted on an end of the arm wand and configured to provide the necessary down-force to balance a cartridge and arm wand during operation, thereby providing improved stability with significant improvement in sound quality.

15 Claims, 7 Drawing Sheets

MAGNETICALLY STABILIZED PIVOTABLE TONEARM

TECHNICAL FIELD

The present invention pertains to the field of tonearms used in record players, specifically focusing on a uniquely pivotable tonearm stabilized by magnetic fields to achieve superior fidelity during playback.

BACKGROUND

A record player, also known as a phonograph, reproduces sound through a stylus that traces a groove on a spinning disc. Over the years, innovations in turntables, cartridges, and tonearms have aimed to enhance sound fidelity. The role of the tonearm is crucial, as it must stabilize the cartridge for accurate groove tracking and translation of mechanical signals into electrical ones for amplification and playback. The ideal tonearm should facilitate smooth tracking with minimal friction and sufficient inertia to withstand stylus-generated energy.

Two primary tonearm designs exist. The gimbal design, more prevalent, restricts the tonearm to two degrees of freedom (Yaw and Pitch), enhancing stability via two sets of bearings. Despite ease of use, these designs can exhibit bearing friction, leading to dulled high-frequency responses.

The unipivot arm design, with three degrees of freedom (Roll, Yaw, and Pitch), is preferred by audiophiles for its lower friction and minimal bearing chatter. It offers a clear, artifact-free sound. However, challenges include setup complexity and handling instability due to body roll.

Yet, unipivot arms suffer limitations especially in bass. Axial instability along the horizontal bearing diminishes bass slam, as the arm lacks the rigidity to prevent left-right movement while tracking high-energy, low-frequency signals.

There have been a few patent applications regarding magnetically stabilized tonearm for reproduction and replay of records, such as U.S. Pat. No. 7,086,071 B2 entitled "Spring-suspension magnetically stabilized pick-up arm", DE 102007029039 B4 entitled "Tonearm for turntables", and WO 2020071966 A2 entitled "Electromagnetic device for damping the tone arm of a record player (variants) and magnetic element for said device (variants)". The above-mentioned patent applications attempt to address the problems cited in the background as prior art over the presently disclosed subject matter.

However, these prior art designs, while enhancing playback considerably, carry their own compromises. They may impact the center of gravity and tracking capabilities.

This novel design seeks to address weaknesses like instability, setup complexity, and bass quality by incorporating magnetic stabilization while preserving the clear and crisp sound signature of the finest unipivot designs.

SUMMARY

The present invention generally discloses a uniquely pivotable tonearm (hereinafter, "tonearm") stabilized by magnetic fields to achieve superior fidelity during playback. Further, the present invention discloses a tonearm with improved handling, adjustability and stability with a significant boost in sound quality, especially in a bass region.

According to the present invention, the tonearm is an innovative and intelligent solution that has been designed to provide improved stability with a significant boost in sound quality, and ease of use over the traditional unipivot design. The tonearm provides improved stability with the use of magnetic stabilization and damping.

In one embodiment, the tonearm comprises an arm wand having a proximal end and a distal end. The proximal end is connected to one end of an arm wand body. The distal end is connected to a headshell. In one embodiment, the tonearm further comprises two or more torsional elements. In one embodiment, the torsional elements are selected from a group consisting of low-stretch Aramid filaments, Ultra-high molecular weight polyethylene filaments, Carbon nano tubes, or any other high strength filaments. The arm wand is suspended using two or more torsional elements. In one embodiment, the torsional elements are at least two low-stretch strings.

In one embodiment, the tonearm further comprises a detachable top nut assembly positioned over a top chassis. In one embodiment, the top nut assembly is rotated to provide anti-skating force by rotating counter clockwise. In one embodiment, the top nut assembly rests on the top chassis and is self-aligned with a circular/cylindrical U-shaped groove that is concentric to the Z-axis of the arm wand to ensure high accuracy and concentricity. The top nut assembly holds the torsional elements via one or more fasteners. In one embodiment, the top nut assembly holds the torsional elements via two fasteners. The fasteners may be, but not limited to, threaded screws, nuts, and bolts. In one embodiment, the torsional elements are suspended from the top nut assembly and mounted to the arm wand body as an inverted V configuration.

In one embodiment, each torsional element has an upper part and a lower part. The upper part of the torsional element allows the arm wand to rotate freely along the Z-axis through the twisting of the torsional element. The top nut assembly is turned counterclockwise to provide a restoring twisting force in the same axis to the arm wand assembly. By adjusting the top nut assembly to the calibrated marking, the user can dial in the exact anti-skating force necessary for playback of record base on the vertical tracking weight set for the cartridge.

In one embodiment, the tonearm further comprises two or more magnets. The magnets include a pair of cylindrical magnets mounted in the arm wand body and a ring magnet mounted on a lower chassis body. In one embodiment, the pair of cylindrical magnets are neodymium magnets. In one embodiment, the pair of cylindrical magnets are aligned to a field line of the ring magnet. In one embodiment, the arm wand is axially stabilized by the ring magnet at its base and the pair of cylindrical magnets along the Y-axis. In one embodiment, the pair of cylindrical magnets and the ring magnet provide a strong magnetic attraction configured to anchor the arm wand from moving off the Z-axis. In one embodiment, the pair of cylindrical magnets are mounted in opposite polarity to the ring magnet to provide the magnetic down-force and damping to the arm wand. The lower part of the torsional element is connected to the arm wand body via a connection point to the main body of the arm wand that also houses the cylindrical magnets. The connection point becomes a horizontal pivot of the arm wand that allows it to rotate freely along the Y-axis.

In one embodiment, the top nut assembly consists of at least two screws that allow for azimuth correction for the cartridge as well as optimum set up of the magnetic gap between the pair of cylindrical magnets and the ring magnet. The two screws include a hexbolt and a setscrew. The hexbolt is used for easy identification of the side of the arm being adjusted, thereby adjusting the azimuth of the arm wand to optimize the playback performance. The top nut assembly is adjusted using an Allen key on the hexbolt.

In one embodiment, the arm wand is replaceable or changeable. Each arm wand can be pre-mounted with different cartridges. The arm wand may be low, medium, or high-mass arm wand with various arm length to match virtually with any cartridge. The tonearm further comprises a square cross section bar configured to support a counterweight. In one embodiment, the counterweight is adjusted along the cross-section bar without any tools for setting of stylus tracking force.

In one embodiment, the counterweight is configured to enable coarse and fine weight adjustments without tools. In a preferred embodiment, the counterweight is not a solid body but hollowed out and ball bearing filled to further reduce and dissipate resonance and partially decouple from the arm wand.

In another embodiment, the tonearm further comprises an optional and adjustable eddy current or fluid damping system that allows for additional tuning to optimize the sound quality of the playback system. Optionally, a screw made of paramagnetic material with a disk-shape head is affixed to the bottom of the arm wand body concentric to the ring magnet. The screw is submerged in the strong magnetic field of the ring magnet configured to provide eddy current damping that resists any quick motion or resonance that can occur in the arm wand during playback. Due to the unique structure of the tonearm, the anti-skating force and damping system are completely symmetrical and in the same axis of the tonearm, which provides the best stability during playback. Further, the tonearm is configured to enable real time adjustments of anti-skating force during playback of a record. The rotation of the top nut enables real time adjustments of anti-skating force during playback of a record.

The above summary contains simplifications, generalizations, and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION OF EXAMPLE EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive.

Figure 1:
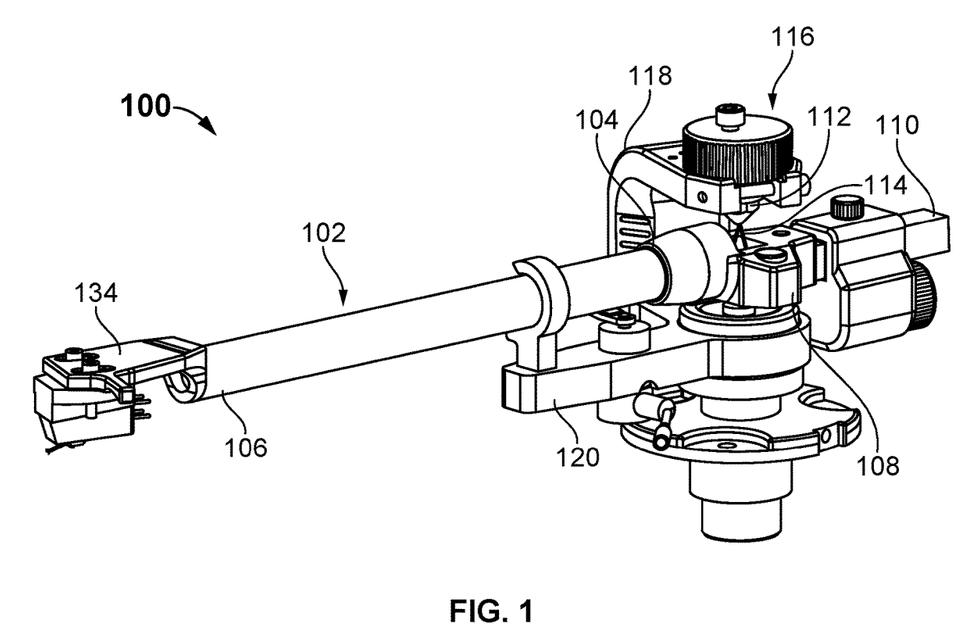
FIG. 1 shows a perspective view of a uniquely pivotable tonearm (hereinafter, "tonearm") stabilized by magnetic fields, according to one embodiment of the present invention.
Figure 2:
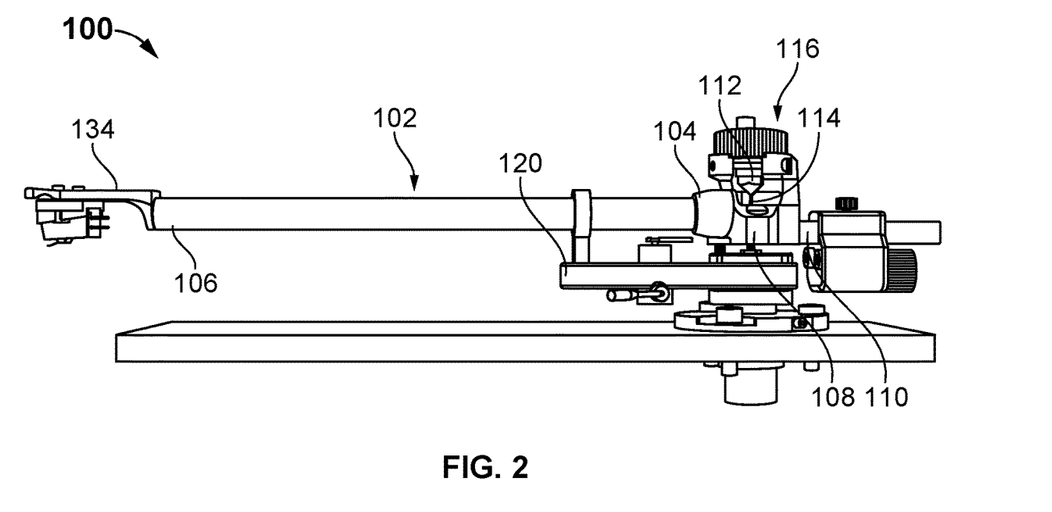
FIG. 2 shows a side view of the tonearm for record players, according to one embodiment of the present invention.

Referring to FIG. 1 to FIG. 2, different perspective views of a uniquely pivotable tonearm stabilized by magnetic fields to achieve superior fidelity during playback (hereinafter referred as "tonearm") 100 are illustrated. In one embodiment, the tonearm 100 is an innovative solution that has been designed to provide improved stability with a significant boost in sound quality, especially in the bass region, and ease of use over the traditional unipivot design.

In one embodiment, the tonearm 100 comprises a tonearm tube 102. The tonearm tube 102 is part of the arm wand (FIG. 7) having a proximal end 104 and a distal end 106. The proximal end 104 is connected to one end of the arm wand body 108. The distal end 106 is connected to a headshell 134. In one embodiment, the tonearm 100 further comprises a square cross-section bar 110 and the counterweight 130. In one embodiment, the tonearm 100 further comprises two or more torsional elements 114. In one embodiment, the torsional elements 114 are selected from a group consisting of low-stretch Aramid (for example, Kevlar®) filaments, Ultra-high molecular weight polyethylene filaments, Carbon nano tubes, or any other high strength filaments. The arm wand is detachably suspended using two or more torsional elements 114. In one embodiment, the torsional elements 114 are at least two low-stretch strings.

In one embodiment, the tonearm 100 further comprises a detachable top nut assembly 116 rest over a top chassis 118. In one embodiment, the top nut assembly 116 may be rotated to provide anti-skating force by rotating counter clockwise. In one embodiment, the top nut assembly 116 rests on the top chassis 118 and is self-aligned with a circular/cylindrical U-shaped groove 112 that is concentric to the z-axis of the arm wand to ensure high accuracy and concentricity. The top nut assembly 116 holds the torsional elements 114 via one or more fasteners. In one embodiment, the top nut assembly 116 holds the torsional elements 114 via two fasteners. The fasteners may be, but not limited to, threaded screws, nuts, and bolts. In one embodiment, the torsional elements 114 are suspended from the top nut assembly 116 and mounted to the arm wand body 108 as an inverted V configuration.

Figure 3:
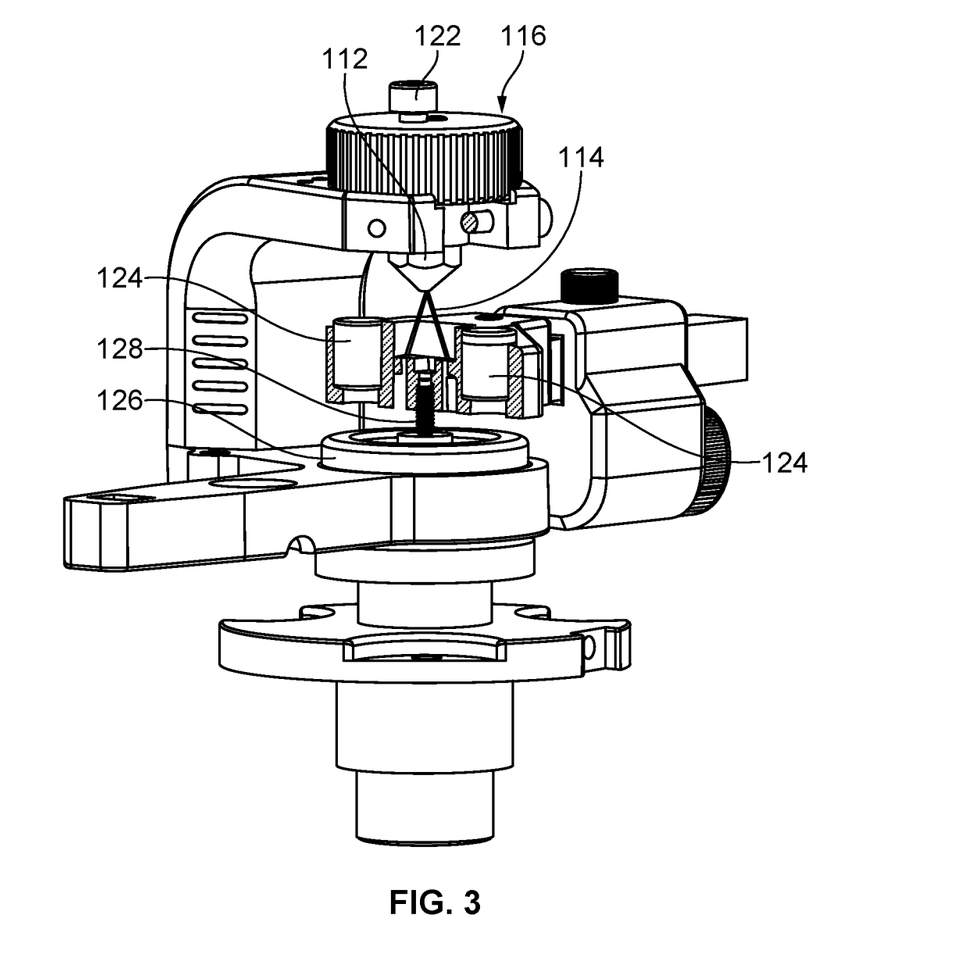
FIG. 3 shows a cross-sectional view to illustrate a magnetic structure of the tonearm, according to one embodiment of the present invention.

Referring to FIG. 3, a cross-sectional view of a magnetic structure of the tonearm 100 is illustrated. In one embodiment, tonearm 100 comprises the top nut assembly 116 and is self-aligned with the circular U-shaped groove 112 that is concentric to the Z-axis of the arm wand. In one embodiment, the torsional elements 114 are suspended from the top nut assembly 116 and mounted to the arm wand body 108 as an inverted V configuration.

In one embodiment, the magnetic structure of the tonearm 100 comprises two or more magnets. The two or more magnets include a pair of cylindrical magnets 124 mounted in the arm wand body 108 and a ring magnet 126 mounted on a lower chassis body 120. In one embodiment, the pair of cylindrical magnets 124 are neodymium magnets. In one embodiment, the pair of cylindrical magnets 124 are aligned to a field line of the ring magnet 126. In one embodiment, the arm wand is axially stabilized by the ring magnet 126 at its base and the pair of cylindrical magnets 124 along the Y-axis. In one embodiment, the pair of cylindrical magnets 124 and the ring magnet 126 provide a strong magnetic attraction configured to anchor the arm wand from moving off the Z-axis. In one embodiment, the pair of cylindrical magnets 124 are mounted in opposite polarity to the ring magnet 126 to provide the magnetic down-force and damping to the arm wand.

The magnetic force generated by the pair of cylindrical magnets 124 and ring magnet 126 is several times more than the gravitation force acting on the arm wand. This force provides the necessary cantering force on the arm wand assembly preventing any front/back, left/right motion. The use of inverted V configuration also strongly opposes the rolling motion. This stability translates to superior bass performance and stability of the arm during the curing of the tonearm 102. Due to the resistance of "roll" the arm wand feels similar to a gimble arm in normal operation.

In one embodiment, the top nut assembly 116 consists of at least two screws that allow for azimuth correction for the cartridge as well as optimum set up of the magnetic gap between the pair of cylindrical magnets 124 and the ring magnet 126. The two screws include a hexbolt 122 and a setscrew. The hexbolt is used for easy identification of the side of the arm wand the user is adjusting to get the stylus perpendicular to the surface of the record (when viewed from front of the cartridge). In one embodiment, the top nut assembly 116 is adjusted using an Allen key on the hexbolt. Further, the hexbolt 122 and the setscrew has a tiny hole drilled along their axis to facilitate passing through and anchoring of the torsional elements 114.

Figure 4:
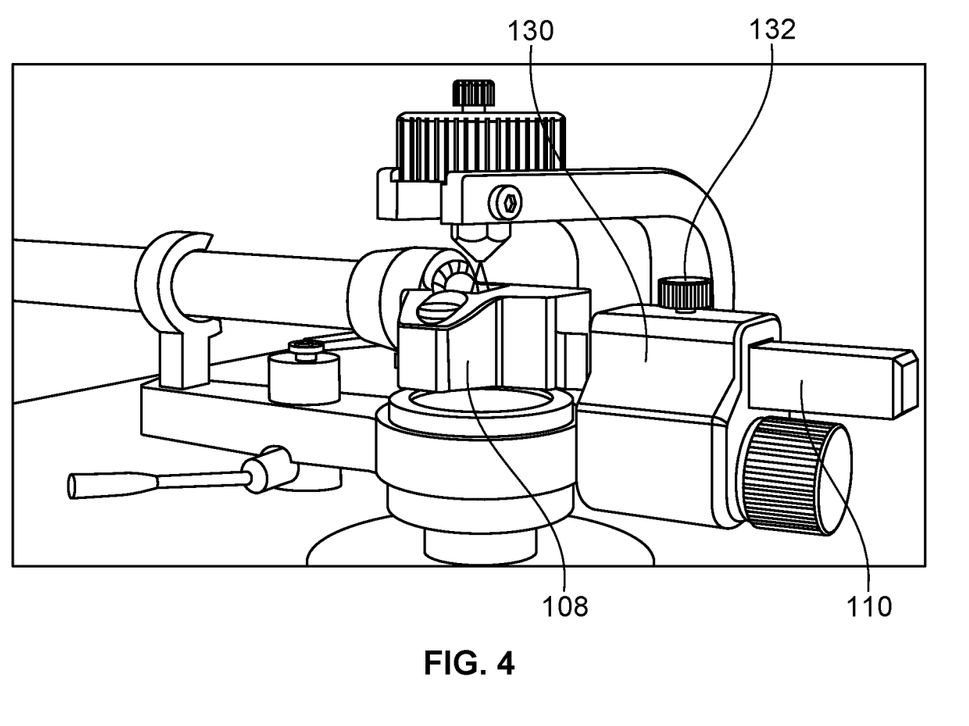
FIG. 4 shows a frictionless pivot system of the tonearm, according to one embodiment of the present invention.

Referring to FIG. 4, a frictionless pivot system of the tonearm 100 is illustrated. In one embodiment, the arm wand is replaceable or changeable. Each arm wand can be pre-mounted with different cartridges. The arm wand may be low, medium, or high-mass arm wand with various arm length to match virtually with any cartridge. In one embodiment, the frictionless pivot system of the tonearm 100 comprises a square cross-section bar 110 configured to support a counterweight 130. The counterweight 130 is slidably positioned over the square cross-section bar 110. In one embodiment, the counterweight 130 is adjusted along the cross-section bar 110 without any tools for tracking force and anti-skating.

In one embodiment, the counterweight 130 is configured to enable coarse and fine weight adjustments without tools. In a preferred embodiment, the counterweight 130 is not a solid body but hollowed out and ball bearing filled to further reduce and dissipate resonance and partially decouple from the arm wand. The counterweight 130 is also designed with thumb screws to facilitate "tool-less" adjustment to add convenience to the user. Further, the tonearm 100 facilitates replacement, remounting, and readjustment of alignment of the detachable arm wand, and weight tracking of counterweight 130 without any tools.

In another embodiment, the tonearm 100 further comprises an optional and adjustable eddy current or fluid damping system that allows for additional tuning to optimize the sound quality of the playback system. Optionally, a screw 128 made of paramagnetic material (such as aluminum) with a disk-shape head is affixed to the bottom of the arm wand body 108 concentric to ring magnet 126. The screw 128 is submerged in the strong magnetic field of the ring magnet configured to provide eddy current damping that resists any quick motion or resonance that can occur in the arm wand during playback. Alternatively, the damping can be applied electronically by varying the magnetic field below or via a viscous fluid and peddle design. The anti-skating force, and the magnetic or fluid damping system is fully symmetrical all along the Z axis of the tonearm 100, which provides better stability during playback.

In one embodiment, the torsional elements 114 and the pair of cylindrical magnets 124 lock the arm wand by creating a virtual pivot. The tonearm 102 mimics the movement of the gimble arm better than most unipivot as it strongly resists "roll" which is the key contributor to the unipivot wobble.

Figure 5:
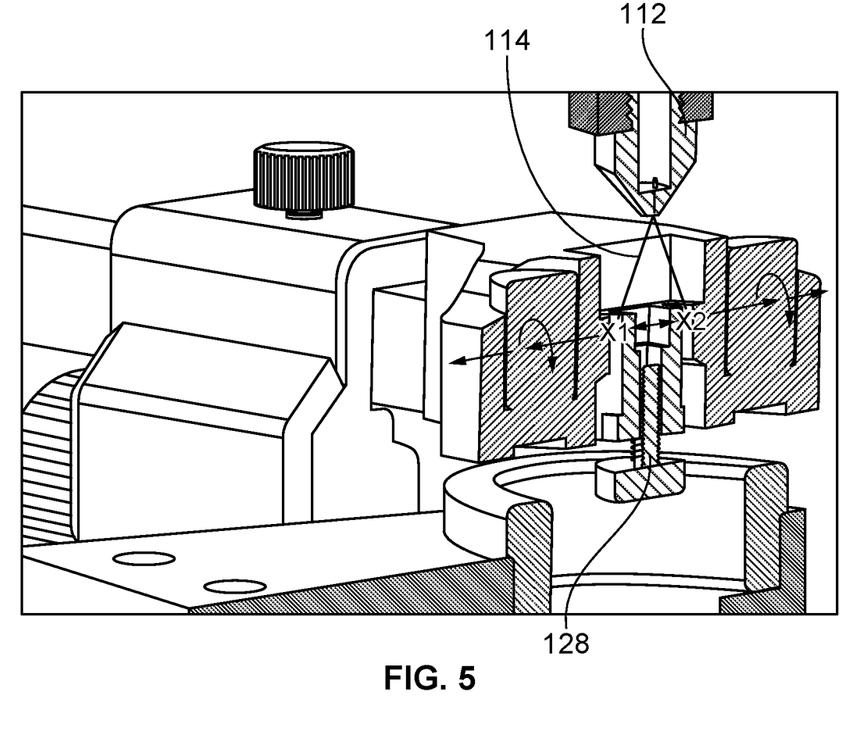
FIG. 5 shows an inverted pivot V configuration to rotate an arm wand along the Y-axis, according to one embodiment of the present invention.

Referring to FIG. 5, an inverted V configuration to rotate the arm wand along the Y-axis is illustrated. The torsional elements 114 are suspended from the top nut assembly 116 and mounted to the arm wand body 108 in an inverted V configuration. In one embodiment, the inverted V configuration is connected to the arm wand body 108 at two points that act as X-axis pivot points X1 and X2. In one embodiment, the X1 and X2 pivot points allow the arm wand to rotate along the Y-axis without any friction. The inverted V configuration is made with high tensile material such as Aramid fiber thread and the point of connection with the arm wand body 108 will act as the X-axis pivot. In one embodiment, the inverted V configuration exits from the top nut assembly 116 at an exit point. The exit point is kept very small with high concentricity with the ring magnet 126, thereby allowing the arm wand to rotate accurately along the Z-axis. In one embodiment, the inverted V configuration allows arm wand to rotate along the Y-axis without any friction.

In one embodiment, each torsional element 114 has an upper part and a lower part. The upper part of the torsional element 114 allows the arm wand to rotate freely along the Z-axis through the twisting of the torsional element 114. The top nut assembly 116 is turned counter-clockwise to provide a restoring twisting force in the same axis to the arm wand assembly. By adjusting the top nut assembly 116 to the calibrated marking, the user can dial in the exact anti-skating force necessary for playback of record. The lower part of the torsional element is connected to the arm wand body 108 via a connection point to the main body of the arm wand that also houses the cylindrical magnets 124. The connection point becomes the horizontal pivot of the arm wand that allows it to rotate freely along the Y-axis.

Figure 6:
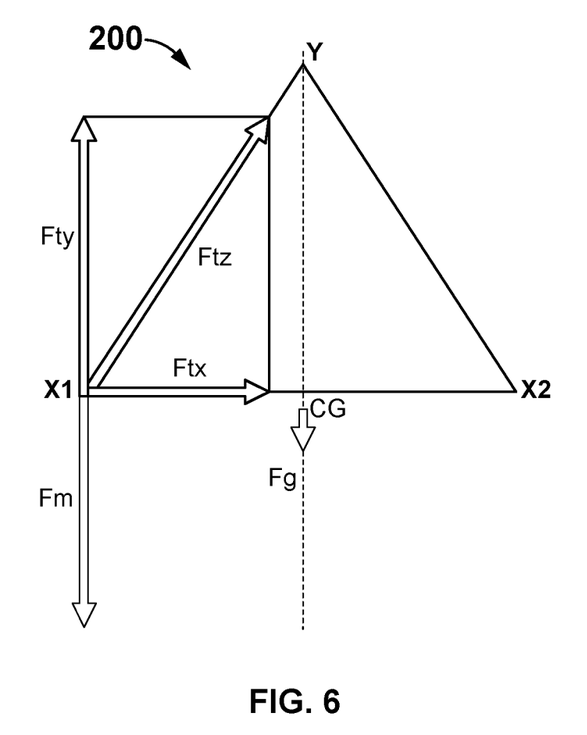
FIG. 6 shows a line drawing illustrating the direction of various forces applied on different axes, according to one embodiment of the present invention

Referring to FIG. 6, a line drawing 200 to show the direction of the force applied on different axes is illustrated. The X1 pivot point applies the force on X, Y, and Z axes. The X1 pivot point applies tensional force ($F_{tx}$, $F_{ty}$, and $F_{tz}$) in X, Y, and Z axes, respectively. Also, the X1 pivot point applied a magnetic force ($F_m$) and gravitational force ($F_g$). In one embodiment, the center of the gravitational force of the arm wand is designed to be slightly below the pivot to improve stability.

Figure 7:
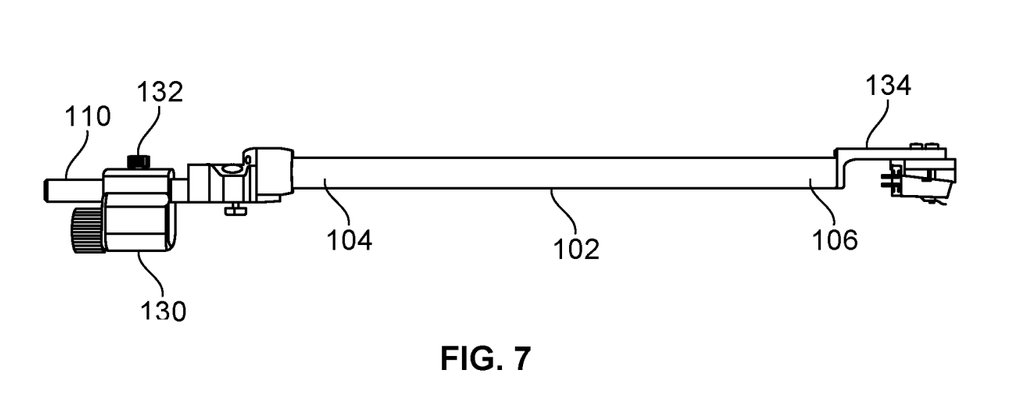
FIG. 7 shows the side view of the tonearm, according to one embodiment of the present invention.

Referring to FIG. 7, a side view of the tonearm 102 is illustrated. The tonearm 102 has a proximal end 104 and a distal end 106. In one embodiment, the proximal end 104 is connected to the arm wand body 108. The counterweight 130 of the tonearm 102 is mounted on the square cross section bar 110. The counterweight 130 is moved along the arm wand by adjusting a screw 132, thereby changing the Vertical Tracking Force. In one embodiment, the counterweight 130 enables coarse and fine weight adjustments without tools. In one embodiment, the distal end 106 is connected to the headshell 134. The tonearm 102 provides positive headshell offset to make the stylus closer to the center of gravity (CG) of the tonearm 102. In one embodiment, the tonearm 102 has a very rigid design based on non-resonance carbon fiber, an aluminum alloy (or any other rigid material) center element, and a stainless-steel end stub for counterweight 130.

As the tonearm 102 is stable and free from roll, there is no need to manipulate the center of gravity (CG) of the arm wand with an adjustable offset counterweight like usual unipivot design. Instead, the counterweight 130 of the tonearm 102 is mounted on a square cross section bar 110 with the center of gravity (CG) designed to be slightly below the axis of the arm wand for stability and easy setup.

Figure 8:
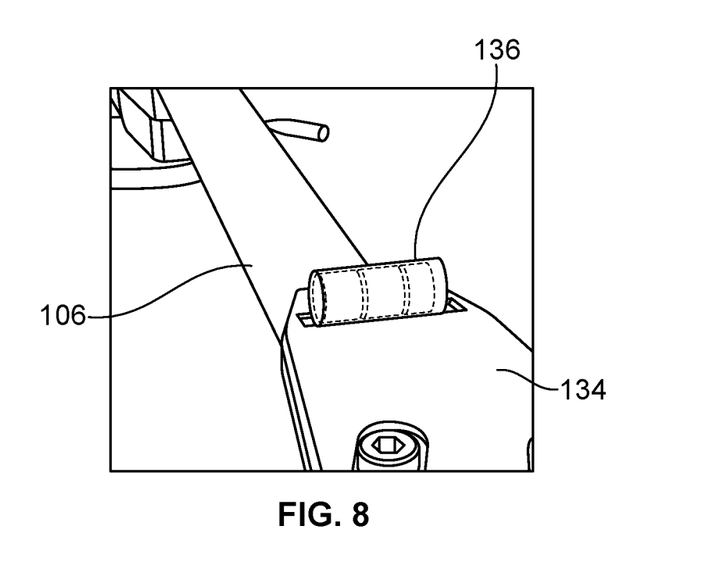
FIG. 8 shows a bubble level for leveling the tonearm to add in azimuth adjustment, according to one embodiment of the present invention.

Referring to FIG. 8, a bubble level 136 for leveling the tonearm 102' is illustrated. The tonearm 102 is handled like a gimble arm without the unpivot wobble. The bubble level 136 is used for the leveling of the arm tube, without the need for scopes or tedious eyeballing with protractor.

Figure 9:
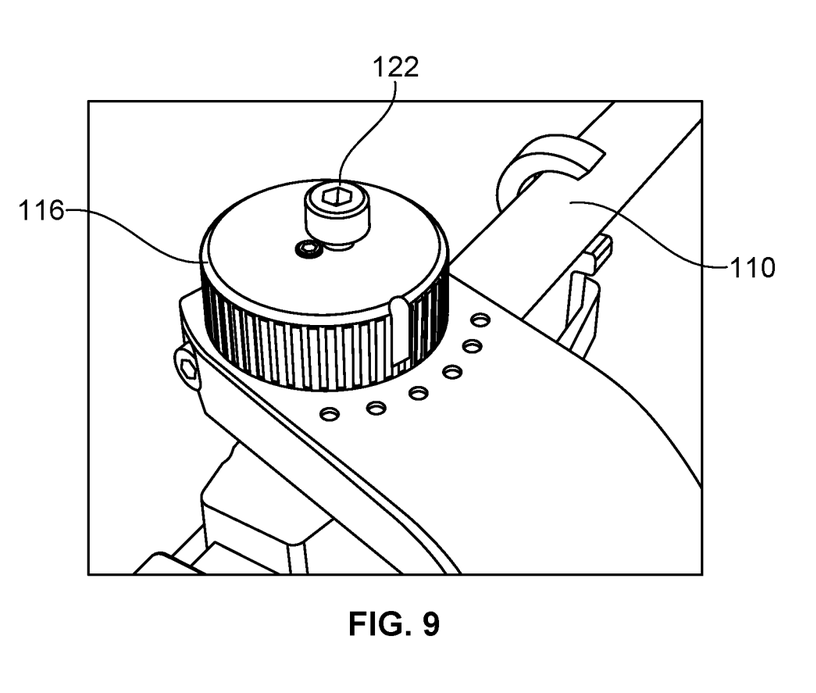
FIG. 9 shows a setscrew configured to adjust the Azimuth of the arm, according to one embodiment of the present invention.

Referring to FIG. 9, a top nut assembly 116 for adjusting the anti-skating force is illustrated. In one embodiment, the top nut assembly 116 is used to perform repeatable anti-skating adjustment and tracking weight adjustment without any tools. In one embodiment, the top nut assembly 116 comprises a Hexbolt 122. In one embodiment, the azimuth is adjusted by tightening or loosening the Hexbolt 122. Thereby, the tonearm 100 is configured to enable real time adjustments of anti-skating force during playback of a record. The rotation of the top nut assembly 116 enables real time adjustments of anti-skating force during playback of a record.

According to the present invention, the pivot, magnetic stabilization, anti-skate control and magnetic damping are totally concentric, making the tonearm 100 fully symmetric along the rotational axis. The tonearm 100 allows more stability and reduces side force disturbance during operation. Further, the torsional elements 114 and magnets (124 and 126) allow for near frictionless rotation along the X and Y-axis and having a high degree of resistance towards body Roll.

Advantageously, the tonearm 100 of the present invention provides improved stability with significant improvement in sound quality and ease of use over the traditional unipivot design. The arm wand of the tonearm 100 is design to be user changeable. As the complete arm wand assembly is interchangeable inclusive of the counterweight, it does not require rebalancing when mounted back in the arm base. This is a desirable feature as the customer may have different cartridges and can now easily enjoy them without tedious re-setting up of the tonearm.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A uniquely pivotable tonearm stabilized by magnetic fields to achieve superior fidelity during playback, comprising:
    a tonearm comprising an arm wand having a proximal end connected to one end of an arm wand body and a distal end connected to a headshell,
        wherein the arm wand is detachably suspended using two or more torsional elements;
    a detachable top nut assembly positioned over a top chassis and self-aligned with a circular U-shaped groove, wherein the top nut assembly is rotated to provide an anti-skating force by rotating counter clockwise,
        wherein the two or more torsional elements are suspended from the top nut assembly and mounted to the arm wand body as an inverted V configuration,
    two or more magnets including a ring magnet mounted on a lower chassis body and a pair of cylindrical magnets mounted in the arm wand body, and
    a counterweight mounted on a square cross-section bar, wherein the square cross-section bar is connected to another end of the arm wand body, wherein the counterweight is configured to provide a necessary downforce to balance a cartridge and arm wand during operation, wherein the counterweight has a defined weight and shape configured to set a center of gravity (CG) slightly below a horizontal pivot point of the arm wand with multiple cartridges, thereby providing improved stability when tracking a groove during playback of warped records.

2. The tonearm of claim 1, wherein the two or more torsional elements are at least two non-stretch strings.

3. The tonearm of claim 1, wherein the inverted V configuration is connected to the arm wand body as an X-axis pivot.

4. The tonearm of claim 1, facilitates interchangeability of arm wands without the need for rebalancing of tracking weight.

5. The tonearm of claim 1, wherein the rotation of the top nut assembly allows for real time adjustments of an anti-skating force during playback of a record.

6. The tonearm of claim 1, wherein the pair of cylindrical magnets are aligned to a field line of the ring magnet.

7. The tonearm of claim 1, wherein the arm wand is axially stabilized by the ring magnet at its base and the pair of cylindrical magnets along a Y-axis.

8. The tonearm of claim 1, wherein the ring magnet and pair of cylindrical magnets provide a strong magnetic attraction configured to anchor the arm wand from moving off a Z-axis.

9. The tonearm of claim 1, wherein the pair of cylindrical magnets are mounted in opposite polarity to the ring magnet to provide a magnetic down-force and damping to the arm wand.

10. The tonearm of claim 1, wherein each torsional element has an upper part to allow the arm wand to rotate freely along a Z-axis through the twisting of the torsional element, and a lower part connected to the arm wand body via a connection point to house the pair of cylindrical magnets.

11. The tonearm of claim 10, wherein the connection point is a horizontal pivot of the arm wand that allows the arm wand to rotate freely along a Y-axis.

12. The tonearm of claim 1, wherein the top nut assembly consists of at least two screws that allow for real time azimuth adjustment for the cartridge and an optimum set up of a magnetic gap between the ring magnet and the pair of cylindrical magnets.

13. The tonearm of claim 1, further comprises an optional and adjustable eddy current or fluid damping system configured to allow for additional tuning to optimize the sound quality of a playback system.

14. The tonearm of claim 13, wherein the anti skating force, and the adjustable eddy current or fluid damping system are fully symmetrical along a Z-axis to provide better stability during playback.

15. The tonearm of claim 1, wherein the counterweight is configured to enable coarse and fine weight adjustments without tools.

* * * * *